US007826089B2

(12) United States Patent
Inoue

(10) Patent No.: US 7,826,089 B2
(45) Date of Patent: Nov. 2, 2010

(54) IMAGE PROCESSING METHOD, PROGRAM, COMPUTER READABLE INFORMATION RECORDING MEDIUM, IMAGE PROCESSING APPARATUS AND IMAGE FORMING APPARATUS

(75) Inventor: Yuuki Inoue, Chiba (JP)

(73) Assignee: Ricoh Company, Ltd., Tokyo (JP)

( * ) Notice: Subject to any disclaimer, the term of this patent is extended or adjusted under 35 U.S.C. 154(b) by 1105 days.

(21) Appl. No.: 10/804,368

(22) Filed: Mar. 18, 2004

(65) Prior Publication Data

US 2004/0184658 A1     Sep. 23, 2004

(30) Foreign Application Priority Data

Mar. 19, 2003  (JP)  ............................. 2003-076154
Feb. 25, 2004  (JP)  ............................. 2004-050207

(51) Int. Cl.
*G06F 15/00*  (2006.01)
*G06K 1/00*   (2006.01)
*G05F 3/08*   (2006.01)

(52) U.S. Cl. .................. 358/1.9; 358/1.13; 358/504; 358/518; 358/521; 345/581

(58) Field of Classification Search .................. 358/1.9, 358/1.13, 521, 527, 504, 518; 355/38; 345/581
See application file for complete search history.

(56) References Cited

U.S. PATENT DOCUMENTS

| | | | | |
|---|---|---|---|---|
| 4,929,978 A | * | 5/1990 | Kanamori et al. | 355/38 |
| 5,257,097 A | * | 10/1993 | Pineau et al. | 358/500 |
| 5,712,930 A | * | 1/1998 | Watanabe | 382/270 |
| 6,891,649 B1 | * | 5/2005 | Kondo | 358/527 |
| 6,943,915 B1 | * | 9/2005 | Teraue | 358/1.9 |
| 6,954,286 B1 | * | 10/2005 | Muramoto | 358/1.9 |
| 7,079,280 B2 | * | 7/2006 | Ohkubo | 358/1.6 |
| 7,199,900 B2 | * | 4/2007 | Ogatsu et al. | 358/1.9 |
| 7,206,094 B2 | * | 4/2007 | Kumada et al. | 358/1.16 |
| 7,251,058 B2 | * | 7/2007 | Pop | 358/1.9 |
| 7,274,487 B2 | * | 9/2007 | Fukasawa | 358/1.9 |
| 7,310,167 B2 | * | 12/2007 | Shirasawa | 358/1.9 |
| 7,355,748 B2 | * | 4/2008 | Arai et al. | 358/1.9 |
| 7,403,315 B2 | * | 7/2008 | Tsuji et al. | 358/1.9 |
| 7,414,752 B2 | * | 8/2008 | Adam et al. | 358/1.9 |

(Continued)

FOREIGN PATENT DOCUMENTS

JP    2001-45313    2/2001

(Continued)

OTHER PUBLICATIONS

Sep. 9, 2008 official action in connection with a counterpart Japanese patent application No. 2004-050207.

*Primary Examiner*—Twyler L. Haskins
*Assistant Examiner*—Dennis Dicker
(74) *Attorney, Agent, or Firm*—Cooper & Dunham LLP

(57) ABSTRACT

An image processing method for performing color conversion among a plurality of image forming apparatuses, includes the steps of: a) producing a plurality of color profiles provided for performing color conversion on input image information within a same color space or through different color spaces; and b) selecting one of the plurality of color profiles whereby color in an image formed by one of the plurality of image forming apparatuses may be approximately equal to color of an image formed by another of the plurality of image forming apparatuses.

16 Claims, 9 Drawing Sheets

U.S. PATENT DOCUMENTS

| | | |
|---|---|---|
| 7,557,957 B2 * | 7/2009 | Kumada et al. ............... 358/1.9 |
| 7,719,714 B2 * | 5/2010 | Tsuji .......................... 358/1.9 |
| 2002/0036787 A1 | 3/2002 | Kondo |
| 2002/0051159 A1 | 5/2002 | Tamagawa |
| 2002/0163659 A1 * | 11/2002 | Ohkubo ...................... 358/1.9 |
| 2003/0034983 A1 | 2/2003 | Muramoto |
| 2003/0128379 A1 | 7/2003 | Inoue |
| 2004/0004731 A1 * | 1/2004 | Itagaki ....................... 358/1.9 |
| 2004/0130739 A1 * | 7/2004 | Adam et al. ................. 358/1.9 |

FOREIGN PATENT DOCUMENTS

| | | |
|---|---|---|
| JP | 2001-88364 | 4/2001 |
| JP | 2001-358938 | * 12/2001 |
| WO | WO93/20648 | 10/1993 |

* cited by examiner

FIG.4

| | COLOR PATCH (INPUT VALUES FOR PRINTER A) | | | MEASURED VALUES ON OUTPUT MATTER FROM PRINTER A | | | ORIGINAL OUTPUT RGB VALUES IN PRINTER B | | | COLOR SIMULATION RGB VALUES | | |
|---|---|---|---|---|---|---|---|---|---|---|---|---|
| | R | G | B | L | a | b | R | G | B | R | G | B |
| 1 | 0 | 0 | 0 | 17.53 | 0.70 | 0.36 | 0 | 0 | 0 | 0 | 0 | 0 |
| 2 | 0 | 0 | 64 | 20.61 | -0.82 | -31.31 | 1 | 30 | 81 | 2 | 60 | 143 |
| 3 | 0 | 0 | 128 | 25.52 | -1.97 | -39.85 | 1 | 71 | 155 | 6 | 78 | 188 |
| 4 | 0 | 0 | 192 | 27.90 | 0.53 | -47.11 | 1 | 101 | 224 | 5 | 86 | 246 |
| 5 | 0 | 0 | 255 | 30.09 | 4.02 | -53.26 | 2 | 104 | 230 | 33 | 88 | 255 |
| 6 | 0 | 64 | 0 | 29.21 | -41.39 | 14.94 | 43 | 86 | 1 | 5 | 116 | 0 |
| 7 | 0 | 64 | 64 | 30.30 | -35.55 | -5.80 | 12 | 86 | 76 | 0 | 116 | 68 |
| 8 | 0 | 64 | 128 | 32.11 | -8.44 | -44.99 | 1 | 93 | 176 | 9 | 107 | 216 |
| ... | | | | | | | | | | | | |
| 118 | 255 | 192 | 128 | 73.49 | 20.35 | 21.94 | 255 | 160 | 115 | 255 | 145 | 142 |
| 119 | 255 | 192 | 192 | 73.23 | 25.72 | 0.84 | 255 | 159 | 184 | 255 | 138 | 206 |
| 120 | 255 | 192 | 255 | 72.84 | 28.22 | -14.21 | 247 | 151 | 255 | 226 | 139 | 255 |
| 121 | 255 | 255 | 0 | 85.60 | -5.95 | 94.91 | 255 | 255 | 54 | 255 | 248 | 0 |
| 122 | 255 | 255 | 64 | 86.85 | -7.98 | 77.87 | 255 | 255 | 90 | 250 | 255 | 47 |
| 123 | 255 | 255 | 128 | 87.82 | -7.90 | 56.07 | 255 | 255 | 123 | 248 | 250 | 90 |
| 124 | 255 | 255 | 192 | 89.45 | -4.38 | 21.83 | 255 | 255 | 169 | 255 | 247 | 160 |
| 125 | 255 | 255 | 255 | 90.99 | 0.69 | -3.12 | 255 | 255 | 255 | 255 | 255 | 255 |

IMAGE PROCESSING METHOD, PROGRAM, COMPUTER READABLE INFORMATION RECORDING MEDIUM, IMAGE PROCESSING APPARATUS AND IMAGE FORMING APPARATUS

BACKGROUND OF THE INVENTION

1. Field of the Invention

The present invention relates to an image processing method, a program, a computer readable information recording medium, an image processing apparatus and an image forming apparatus, whereby printing output color can be made approximately coincident among a plurality of color image forming apparatuses.

2. Description of the Related Art

Recently, there are various types of color printers such as those in an ink jet type, a laser type, and so forth. However, since difference in ink or toner material or difference in reproduction color target among respective manufacturers may cause difference in color reproduction even from a common input color among respective printers.

Thereby, even if predetermined data is applied, which is already adjusted for achieving a desired color in an enterprise's logo or so with the use of an ink-jet type of color printer for example, to another color laser printer to print out the same logo, the color thereof resulting therefrom may become remarkably different from the original one. In such a case, it is necessary to perform an extra work to again adjust the original input data for the purpose of achieving the same desired color in the logo even with the use of the other color printer.

Japanese Laid-open Patent Application No. 2001-088364 discloses a method for solving this problem. According to this prior art, predetermined color chart images formed on respective recording medium papers by a color copier and a color printer are read by the color copier. Then, based on tone characteristics obtained from both the images, image correction characteristics in the color copier is set appropriately. Thereby, the color copier is made to simulate color reproduction characteristics of the color printer. Thereby, input/output tone characteristics of ink (toner) with respect to the respective four types of ink, i.e., cyan, magenta, yellow and black used in the 'original printer A' and the 'printer B which will be made to represent the color of the printer A' are corrected so as to achieve representation of the color of the printer A by the printer B.

SUMMARY OF THE INVENTION

In the above-mentioned method according to the prior art, correction is performed only on tone characteristics in the ink (toner). However, for example, when the color material of ink (toner) applied is changed, different color may occur even from the same tone value, and thus, only correction of tone characteristics regarded as device dependent color may not be sufficient for achieving same color reproduction with the use of a different color printer. Furthermore, according to the above-mentioned method in the prior art, correction of tone characteristics is performed with respect to each single color (cyan, magenta, yellow or black) of ink (toner). However, color reproduction in a color printer generally employs a subtractive color mixing method of performing color reproduction by laying a plurality of colors of ink (toner) over each other according to an error diffusion method, a dither method or so. Thereby, a color obtained from the mixing depends on a form of the dither matrix applied therein and thus may differ even after each single color is properly corrected.

Therefore, an object of the present invention is to provide an image processing method, a program, a computer readable recording medium, an image processing apparatus and an image forming apparatus, whereby it becomes possible to positively represent color of one printer by another printer at high accuracy, even when the color material applied differs therebetween.

An image processing method according to the present invention includes the steps of: a) producing a plurality of color profiles provided for performing color conversion on input image information within a same color space or through different color spaces; and b) selecting one of the plurality of color profiles whereby color in an image formed by one of the plurality of image forming apparatuses may be approximately equal to color of an image formed by another of the plurality of image forming apparatuses.

In this method, it is preferable that the step a) includes the step of actually measuring color of an image formed by one of the plurality of image forming apparatuses, and producing the color profile whereby color of an image formed by another of the plurality of image forming apparatuses may be approximately equal to the thus-measured color.

Further, it is preferable that the step b) includes the steps of: b-1) inputting image data in an RGB color space; and b-2) selecting one of the plurality of color profiles provided for performing color conversion within the RGB color space whereby colors of images formed by first and second image forming apparatuses of the plurality of image forming apparatuses may become approximately equal to one another.

Furthermore, it is preferable that the step b) includes the steps of: b-1) inputting image data in an RGB color space; and b-2) selecting one of the plurality of color profiles provided for performing color conversion from the RGB color space to a CMYK color space whereby colors of images formed by first and second image forming apparatuses of the plurality of image forming apparatuses may become approximately equal to one another.

Furthermore, the plurality of color profiles may be provided in a host computer, and the step b) may be performed by the host computer.

Furthermore, the plurality of color profiles may be provided in an image forming apparatus, and the step b) may be performed by the image forming apparatus.

Furthermore, it is preferable that color profiles selected in the step b) include a color profile whereby a color difference in a predetermined color space, which does not depend on apparatus types, between images formed by the respective image forming apparatuses may become minimum.

It is also preferable that the color space is one which does not depend on apparatus types is any one of an LAB color space, an XYZ color space and an LUV color space defined by CIE. The CIE is an abbreviation of International Commission on Illumination. As to this organization, see a homepage at a URL: http://www.cie.co.at/cie/home.html, on Feb. 16, 2004.

The step a) of selecting one of the plurality of color profiles to be actually applied may be performed externally of the relevant image forming apparatus.

The step a) of selecting one of the plurality of color profiles to be actually applied may be performed from designating an image forming apparatus which is actually applied.

It is also preferable that the color profile which effectively reduces a color difference between images in the predetermined color space which does not depend on apparatus types is created by the following steps: c) producing, in a computer, color patches from uniformly dividing a color space which depends on an apparatus type of a first image forming apparatus; d) obtaining corresponding color patches by forming an image from the first image forming apparatus according to color patch data produced by the computer in the step c); e) measuring coordinate values of the color patches obtained in the step d) in the predetermined color space which does not depend on apparatus types: f) obtaining a relationship, for each color patch, between the color space which depends on the apparatus type of the first image forming apparatus and the predetermined color space which does not depend on apparatus types, based on a measurement result of the step e); g) obtaining a relationship between the predetermined color space which does not depend on apparatus types in an image formed by a second image forming apparatus and the predetermined color space which depends on an apparatus type of the second image forming apparatus; h) calculating a coordinate value in the color space which depends on the apparatus type of the second image forming apparatus for each color patch whereby color of an image formed by the second image forming apparatus has a color difference which is minimum with respect to color of an image formed by the first image forming apparatus, according to the relationship between the color space which does not depend on apparatus types in an image formed by the second image forming apparatus and the color space which depends on the apparatus type of the second image forming apparatus obtained in the step g).

It is possible to provide the present invention in a form of a program which causes a computer to execute the respective steps of the image processing method mentioned above.

It is also possible to provide the present invention in a form of a computer readable information recording medium which stores therein the above-mentioned program.

An image processing apparatus according to the present invention includes: a part performing color conversion among a plurality of image forming apparatuses; and a plurality of color profiles whereby colors of images formed by the respective image forming apparatuses become approximately equal to each other through color conversion performed by the part performing color conversion with the use of the color profiles.

In the above-mentioned image processing apparatus, it is preferable that the plurality of color profiles are provided from actually measuring color of an image formed by one of the plurality of image forming apparatuses, and creating a color profile whereby color of an image approximately equal thereto is formed by another of the plurality of image forming apparatuses.

Also it is preferable that the plurality of color profiles include color profiles whereby a color difference in a color space which does not depend on apparatus types between images formed by the image forming apparatuses is effectively reduced.

Also it is preferable that the color space which does not depend on apparatus types is any one of a LAB color space, an XYZ color space and an LUV color space defined by CIE.

The above-mentioned image processing apparatus may be provided in a form of a printer driver provided in a host computer which outputs printing information to the image forming apparatus.

The above-mentioned image processing apparatus may be provided in a form of a controller provided in one of the plurality of image forming apparatuses which forms an image having color which is made approximately equal to color of image formed by another of the plurality of image forming apparatuses with the use of the color profile.

The plurality of color profiles may be provided in a controller in the image forming apparatus.

The plurality of color profiles may include color conversion tables for performing color conversion in an RGB color space or conversion tables for performing color conversion from an RGB color space to a CMYK color space.

It is also preferable that the above-mentioned image processing apparatus further includes a part for selecting a color profile to be applied from among the plurality of color profiles.

A host computer which provides printing information to the image forming apparatus may include the part for selecting a color profile to be applied from among the plurality of color profiles.

An image forming apparatus according to the present invention includes: the image processing apparatus mentioned above; and an image forming part which forms a visible image on a recording medium based on image information output from the image processing apparatus.

The above-mentioned color space which does not depend on apparatus types is, for example, a LAB color space, an XYZ color space, an LUV color space or such defined by CIE mentioned above. Furthermore, the above-mentioned plurality of image forming apparatuses for which colors formed thereby are made approximately coincident thereamong with respect to common input color according to the present invention may be a plurality of color printers in different types of printing mechanism, i.e., an ink jet type, a thermal type, an electrophotographic type, and so forth, those in the same printing mechanism but produced by different manufactures, those produced by the same manufacture but of different model numbers or such.

According to the present invention, by applying a color profile provided for performing color conversion after appropriately adjusting it, it becomes possible to positively represent, by another printer, color output by one printer even they employ different color materials such as ink or toner, with respect to common input color information.

BRIEF DESCRIPTION OF THE DRAWINGS

Other objects and further features of the present invention will become more apparent from the following detailed description when read in conjunction with the accompanying drawings:

FIG. 4 shows, in one example, color patch data in case where an RGB color space is divided into five divisions; L, a, b values obtained from the printer A when printing is performed with the use thereof; R, G, B values for the printer B; and R, G, B values for color simulation for obtaining the L, a, b values of the printer A from the printer B according to the embodiment of the present invention;

DETAILED DESCRIPTION OF THE PREFERRED EMBODIMENT

An embodiment of the present invention will now be described with reference to figures.

Figure 1:
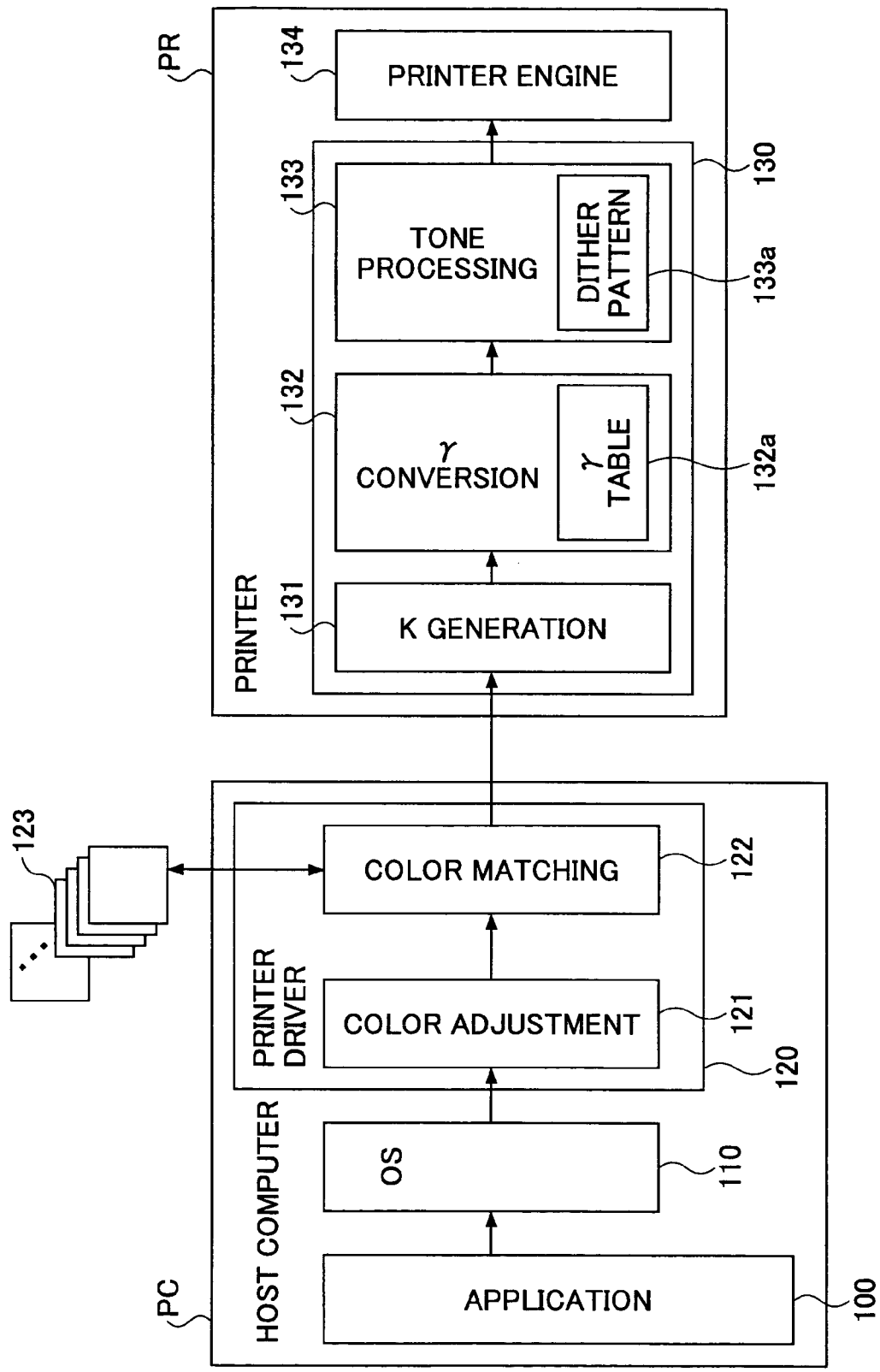
FIG. 1 shows a block diagram of a general color path in a general color printer which is basically applicable to an embodiment of the present invention.

FIG. 1 illustrates a general color path in a general color printer in the related art. The color path shown is a color path in a general color printer for example running in a well-known Microsoft Windows (registered trademark), and a similar color path is employed in various types of printers such as those in an ink jet type, a laser type or such. In a color printer having the color path mentioned above, data for which printing request is made by an application software 100 according to the Windows is transferred to an OS (operation system) of a computer PC in which the Windows runs, and then, the data is further transferred to a printer driver 120.

In the printer driver 120, a color adjustment unit 121 and a color matching unit 122 are provided. In the color adjustment unit 121, general color adjustment mechanisms concerning the entirety of an image such as those for chroma saturation adjustment, color balance adjustment, contrast adjustment and so forth are provided in a manner of being arbitrarily designateable by a user. The color matching unit 122 includes a plurality of color profiles 123 prepared, and, when any one thereof is designated, color matching processing according thereto is performed on given color image information.

The data transferred to the printer driver 120 from the application 100 is generally RGB 8-bit data, and the printer driver 120 executes designated color correction or color matching processing thereto. In this case, the color profile which the printer driver 120 applies is a color profile for converting RGB data into RGB data (RGB to RGB). However, it is also possible to provide a configuration there such that the above-mentioned color correction or color matching processing may be actually executed in the color printer PR itself instead of in the host computer PC.

Then, the printer driver 120 transfers the RGB 8-bit data for which it has executed color conversion with reference to the color profile 123 to a printer controller 130 in the printer PR via a communication device 140 such as an Ethernet (registered trademark) or such. The printer controller 130 in the printer PR converts the thus-received RGB 8-bit data into CMYK 8-bit data in a CMYK color space which is a color space of the printer PR (specifically, in a printer engine 134 thereof), via a K generation unit 131. The K generation unit 131 employs well-known BG/UCR technology, GCR technology or such and converts given color information in the RGB color space into one in the CMYK color space. Then, a γ conversion unit 132 employs a γ curve (γ table) 132a set for performing tone adjustment for each particular printer engine actually applied, for the CMYK data converted from the RGB data by the K generation unit 131, and thus executes γ conversion thereto.

Finally, in order to enable outputting of the thus-obtained CMYK data with the use of the printer engine 134 which has performance for tone expression only in one bit, a tone conversion unit 133 in the printer PR converts the given CMYK 8-bit data into CMYK 1-bit data with the use of an error diffusion method, a dither method or such. There, for example, the conversion is performed with reference to a predetermined dither pattern 133a. The printer engine 134 in the printer PR uses the thus-provided CMYK 1-bit data, forms an image based thereon, and thus, prints out the image on a recording medium such as a paper.

As may be seen from the configuration of the above-discussed color path, a difference in color output from such a printer even from common color information, which may occur among individual products of color printers, may occur due to various factors such as a difference in color of ink (toner) itself applied, a difference in the γ curve, a difference in the color matching processing details, a difference in the dither processing details, a difference in the printer engine performance details, or those resulting from a manufacture/fabrication error, an aging factor or so, in a manner of combination thereof. According to Japanese Laid-open Patent Application No. 2001-088364 mentioned above, a correction of the γ curve is applied, and, it can be said that, according to this prior art, in order to achieve accurate representation of color of the printer A from the printer B, a correction is made on input/output characteristics for each of inks (toners) of cyan (C), magenta (M), yellow (Y) and black (K) in the γ conversion unit 132.

In other words, according to this prior art, for example, in the printer driver 120 in the computer PC mentioned above, upon transferring input RGB data to the printer PR, color conversion is performed with the use of the color profile 123, the thus-obtained color-converted RGB data is transferred to the K generation unit (CMYK conversion unit) 131, and then, tone conversion is performed by the γ conversion unit. There, correction is made such that a color difference between respective printers is eliminated by correction in the tone conversion performed in the γ conversion unit 132. In contrast thereto, according to the embodiment of the present invention, instead of the tone conversion in the γ conversion unit 132, the color profile 123 is applied for the purpose of correcting given color information so as to eliminate difference between the respective printers.

The color profile and color matching applied in a color reproduction method according to the embodiment of the present invention are next described in detail. Generally speaking, in color reproduction in such a color printer, which is different from color reproduction in a copier in which color produced should be aimed to the color in the original, a target in color to which color reproduced is aimed is vague by nature. However, recently, a method of color reproduction of a so-called sRGB monitor which represents a color reproduction range of a general CRT monitor has been applied in general also in color printers. To reproduce color in a CRT monitor as an output of a printer in such a manner is called 'color matching', and a data file of a color conversion table used in the color matching is called 'color profile'.

Figure 2:
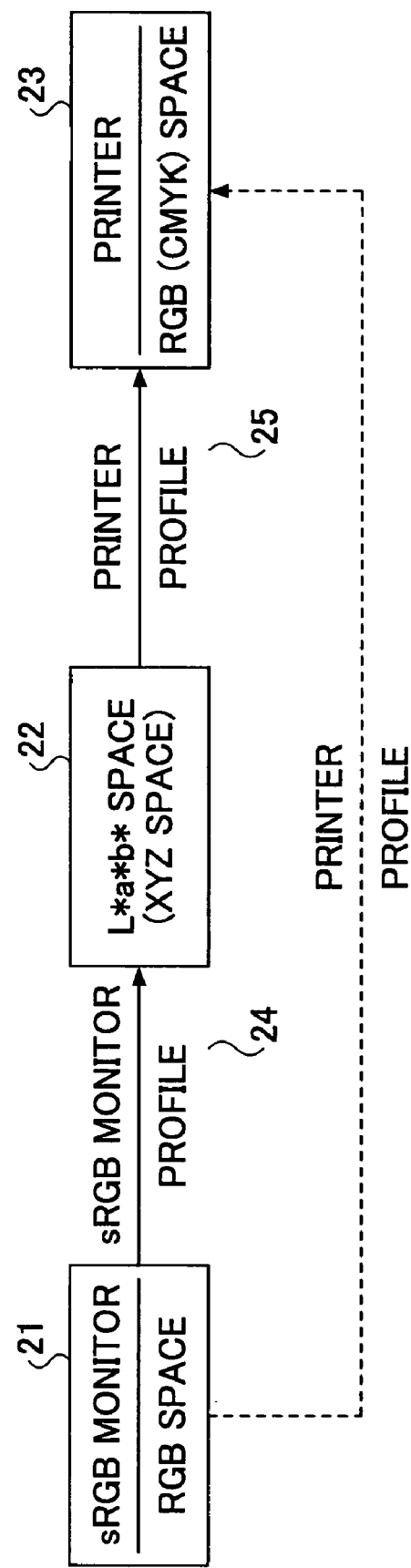
FIG. 2 illustrates a general concept of color matching.

FIG. 2 illustrates a general concept of the color matching. A CRT monitor is a device displaying RGB data by controlling an electron beam strength applied to phosphor dots on a monitor surface according to given data from a computer, for example. However, since the phosphor material applied there or such may be different for each CRT monitor product, color output by a CRT monitor may differ for each product thereof by nature, strictly speaking. The above-mentioned sRGB monitor (standard RGB monitor) 21 is one which defines a color reproduction range which a general CRT monitor can reproduce as mentioned above, and here, an 'sRGB monitor profile 24' is assumed as one providing a relationship between an 'RGB color space' which is a color space depending on a device of the sRGB monitor 21 and a 'L*a*b* (XYZ) color space' which is a color space not depending on the device.

A printer profile 25 is also assumed as one providing a relationship between the a color space of the monitor 21 or such and a color space depending on the device of a printer 23. Actually, the printer profile 25 is made of a color conversion table for mapping the above-mentioned L*a*b* (XYZ) color space which is a device non-dependent color space of the sRGB monitor 21 or an RGB color space which is a device dependent color space of the sRGB monitor to an RGB (CMYK) color space which is a device dependent color space of the printer 23.

The color matching means, as described above, to achieve matching in color coordinates between different color spaces belonging to respective ones of the monitor 21 and the printer 23. In this case, it is possible to select one of several specific ways as to how to achieve the matching. These several ways are called 'rendering indents'. In case of color matching between the monitor 21 and the printer 23, the color space of the monitor 21 is much wider than the color space of the printer 23 in almost all part thereof, in general. Accordingly, it is not possible to represent all the colors of the monitor by the printer, strictly speaking. Therefore, actually, it is necessary to map the wider color space of the monitor 21 to the color space of the printer 23. A specific method of how to achieve this mapping depends on particular ones of the above-mentioned rendering indent applied.

For example, for ColorSync (registered trademark) which is in charge of color matching in a system of the well-known Apple (registered trademark) or ICM which is in charge of color matching in a system of the above-mentioned Windows, the following four rendering indents are prescribed:
 1) Perceptual;
 2) Saturation;
 3) Relative Colorimetric; and
 4) Absolute Colorimetric.

According to the embodiment of the present invention, the relevant processing is appropriately controlled with the use of the color profile 123 provided for performing the color matching in the printer driver 130 as mentioned above, for achieving accurate reproduction of the output color of the printer A, from the printer B. That is, according to the printer profile, i.e., the color profile 123 in the embodiment of the present invention, by mapping the color space of a target (the sRGB monitor 21 in the above-mentioned example) to the color space of the printer engine 23, the target color is made reproducible by the printer 23. Further specifically, in the embodiment, as the target, instead of the sRGB monitor 21, the color space of the printer A is designated, and thereby, the color of the printer A is made reproducible from the printer B.

In order to achieve coincidence in color between these different printers, a configuration of a color conversion table of the color profile 123 is effective. According to the embodiment of the present invention, a form of a lookup table is employed, where output values are described for respective ones of equally arranged input values. As the color conversion table, not only one for color space conversion of 'a device non-dependent color space to a device dependent color space' such as 'L*a*b* to RGB', 'XYZ to RGB' or such, but also one for color conversion of 'a device dependent color space to a device dependent color space' such as 'RGB to RGB', 'RGB to CMYK' or such, may be applied.

In case of handling 8-bit color data, a color conversion table for RGB 256 tone values is needed. However, in this case, the data size thereof becomes very large (256×256× 256). Therefore, commonly, in many cases, data is extracted in a manner of skipping equal number of data each time, and, for the remaining data, interpolation processing or such may be applied to calculate. In order to simplify description of a basic principle of the embodiment of the present invention, a method is next described with the use of an example in which, a color space conversion table of 'RGB to RGB (or CMYK)' is applied, and the color of the printer A is to be reproduced from the printer B, with reference to FIG. 3.

First, color patches obtained from dividing the relevant RGB color space equally are created with the use of predetermined graphic application software in the computer PC shown in FIG. 1. The color patches amount to 125 patches in a case where the RGB space is divided equally by five, to 729 patches in a case of divided by nine, or to 4913 patches in a case of divided by seventeen. More the number of patches applied amount to, the number of available colors increases, and thus, the accuracy in color reproduction increases. Normally, 729 patches obtained from dividing by nine are output by the printer, and then, based on actually measured values thereof, values corresponding to 4913 patches of being divided by seventeen are finally generated, and thus, are actually used, in many cases. Here, as shown in FIG. 4, left end, RGB values (COLOR PATCH (INPUT VALUES FOR PRINTER A)) or color patch data obtained from dividing the RGB space by five are applied. Thus, in this example, as shown, the RGB color space is equally divided by five and thus total 125 color patches are created.

The thus-obtained color patch data is output from the computer PC to the printer A 31 (Step S101 in FIG. 3), L*a*b* (or XYZ) values (which is those in a device non-dependent color space) of color patches 32 printed out from the printer A accordingly are measured by a commercially available color measurement equipment in Step S102. For example, a device in a type DTP41 or a type 938 made by X-Rite Co., Ltd. may be used as the color measurement equipment. Then, with the use of the thus-obtained measured values, correspondence relationship of 'RGB to L*a*b* (XYZ)' for each color patch for the printer A, i.e., a relationship between the device dependent RGB color space (color space in the input color) and the device non-dependent L*a*b* (XYZ) color space (color space of color in the state of printed out on a paper) is obtained in Step S103 in FIG. 3. In other words, in FIG. 4, a relationship between the 'COLOR PATCH' R, G, B and the 'MEASURED VALUES ON OUTPUT MATTER FROM PRINTER A' is obtained.

Next, from the printer B 33, a printer simulator which represents a relationship of 'L*a*b* (XYZ) to RGB (CMYK)' is obtained in Step S106. This relationship corresponds to a relationship between the 'MEASURED VALUES ON OUTPUT MATTER FROM PRINTER A' (center left) and 'COLOR SIMULATION RGB VALUE' (right end) in FIG. 4. How to create this printer simulator is next described.

First, from the printer B, predetermined color patches including mixed colors for which RGB (CMYK) values are known are printed out in Step S104, and, for the color patches thus obtained on the printed matter, L*a*b* (or XYZ) values (device non-dependent colors) are measured by a commercially available color measurement equipment such as that mentioned above, in Step S105. Thus, a relationship of 'RGB (CMYK) to L*a*b* (XYZ)' is obtained for the printer B. Based thereon, with the use of known technology such as a so-called neural network method, the above-mentioned printer simulator representing a reverse relationship of 'L*a*b* (XYZ) to RGB (CMYK)' is established in Step S106. The printer simulator is a tool which is used for obtaining as to which color should be applied as an input RGB value for obtaining any output L*, a*, b* values, from the relationship between input RGB values and output L*a*b* values obtained from the above-mentioned color measurement. A basic concept of this printer simulator and a general method for establishing such a printer simulator are well-known, and the details of the method of establishing the printer simulator are omitted.

In the example shown in FIG. 4, RGB values to be applied in the printer B is obtained such that, therewith, the 'MEASURED VALUES ON PRINTED MATTER OF PRINTER A' (center left) may be obtained as measured values on a printed matter from the printer B. The 'ORIGINAL VALUES IN PRINTER B' (center right in FIG. 4) are values applied in the printer B via the original printer profile which does not include any color adjustment for achieving color originally obtained from the printer A, with respect to the color patches at the left end shown in FIG. 4.

Specifically, description is next made with respect to the color patch number 2 (second line in the table show in FIG. 4), for example. As shown in FIG. 4, the values R, G, B applied in the printer A are (0, 0, 64), and the output measured values L, a, b therefrom are (20.61, −0.82, −31.31). On the other hand, with respect to the same color patch number 2, the original output values R, G, B applied to the printer B are (1, 30, 81), and, the above-mentioned measured values L, a, b=(20.61, −0.82, −31.31) obtained from the printer A cannot be obtained due to some reason such as a difference in printing way, a difference in color material or such between these two printers A and B. Accordingly, it is necessary to change the output RGB values in the printer B so as to adjust the resulting measured values obtained from the printer B for the measured values originally obtained from the printer A.

As a result of the above-mentioned adjustment, the 'COLOR SIMULATION RGB VALUES', i.e., R, G, B=(2, 60, 143) at the right end of FIG. 4 are obtained. That is, with respect to the color patch number 2 for example, R, G, B=(2, 60, 143) thus obtained should be applied for printing out the equivalent color from the printer B, instead of R, G, B=(1, 30, 80). Thereby, the printed output measured values similar to the values L, a, b=(20.61, −0.82, −31.31)) in the 'MEASURED VALUES ON OUTPUT MATTER FROM PRINTER A' at the center left of FIG. 4 are obtained also from the printer B.

Figure 3:
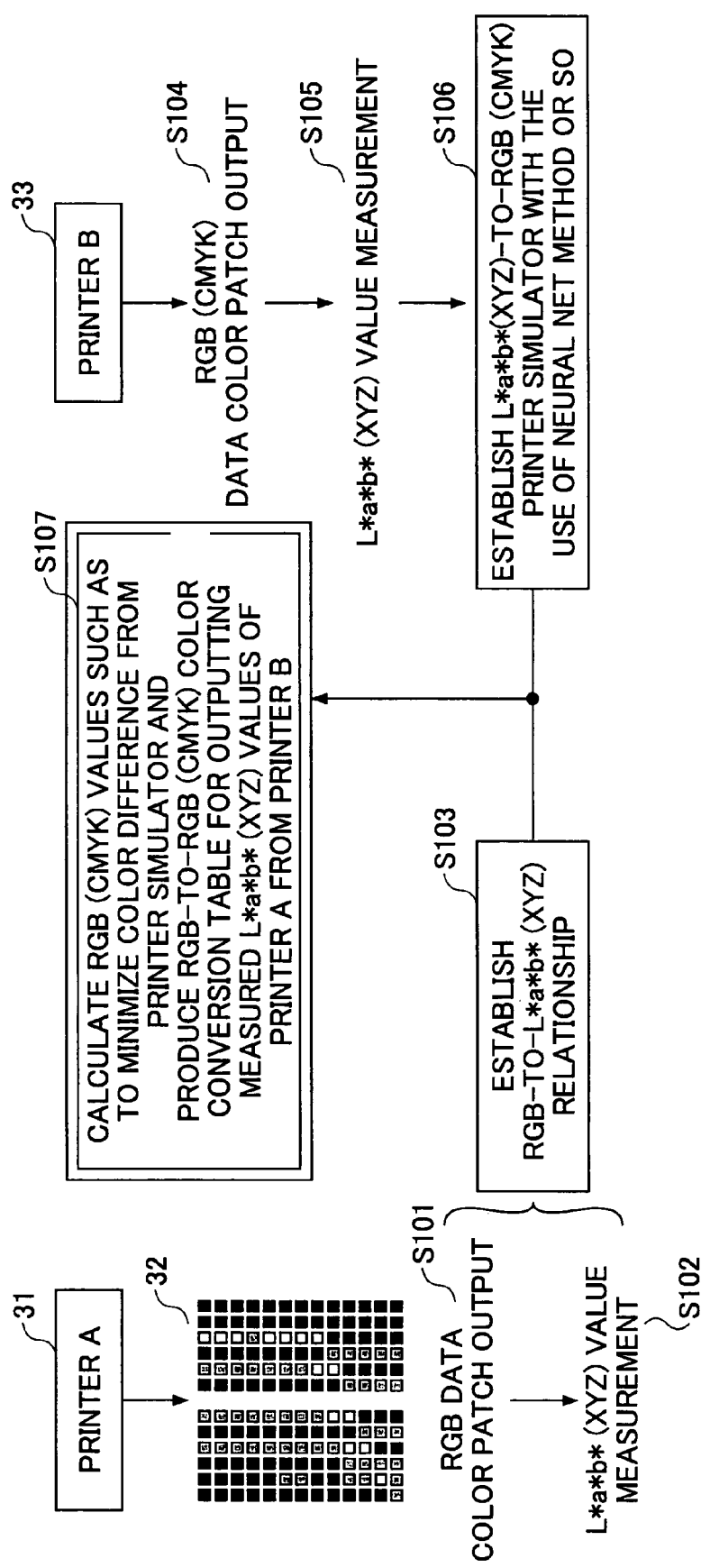
FIG. 3 illustrates a method for representing color of a printer A by a printer B according to the embodiment of the present invention.

Thus, in the printer B, by converting the input color patch values R, G, B=(0, 0, 64) which are originally applied in the printer A into the thus-obtained 'COLOR SIMULATION RGB VALUES' R, G, B=(2, 60, 143), the printed output measured values similar to those originally obtained from the printer A can be obtained also from the printer B. Thus, the step S107 in FIG. 3 is a step of obtaining a correspondence relationship between the color patch RGB values at the left end in FIG. 4 and the color simulation output RGB values at the right end of FIG. 4, and, in the embodiment of the present invention, the color space conversion function achieving color conversion according to the above-mentioned correspondence relationship is added to the color profile of the prior art (in the color profiles 123 in FIG. 1). As a result, in FIG. 1, even in a case where the printer B is connected with the host computer PC instead of the printer A as the printer PR, input color information same as that used for the printer A can cause the printer B to print out color approximately same as that originally printed out by the printer A as a result since the printer driver 120 performs color space correction processing according to the color space conversion function thus added to the color profile 123 so as to adjust the input color information so that the color approximately same as the color of the printer A should be obtained also from the printer B.

In other words, reproduction of color of the printer A from the printer B can be achieved by causing the device non-independent color space 'L*a*b* (XYZ)' printed out by the printer A 31 in response to the color patches to be also printed out by the printer B 33. For this purpose, the relationship from RGB to L*a*b* (XYZ) in the printer A 31 obtained as mentioned above (S103) and the printer simulator of the relationship from L*a*b* (XYZ) to RGB (CMYK) in the printer B 33 also obtained as mentioned above (S106) by the process described above with reference to FIG. 3 are used. The printer simulator is obtainable by an algorithm of calculation for satisfying color difference minimum requirements for obtaining RGB (CMYK) values to be applied to the printer B 33 for causing the printer B 32 to print out color values approximately equal to L*a*b* (XYZ) values reproduced by the printer A 31 from each same color patch finally in Step S107 in FIG. 3. As a result, it is possible to obtain a conversion table of 'RGB to RGB (CMYK)' including a function of enabling reproduction of color of printer A from the printer B even with the same input color information. The function of this conversion table is the function which should be added to the color profiles 123 of the prior art as mentioned above which originally includes a function of color conversion from the color space of the monitor into the color space of the printer as mentioned above.

Figure 5:
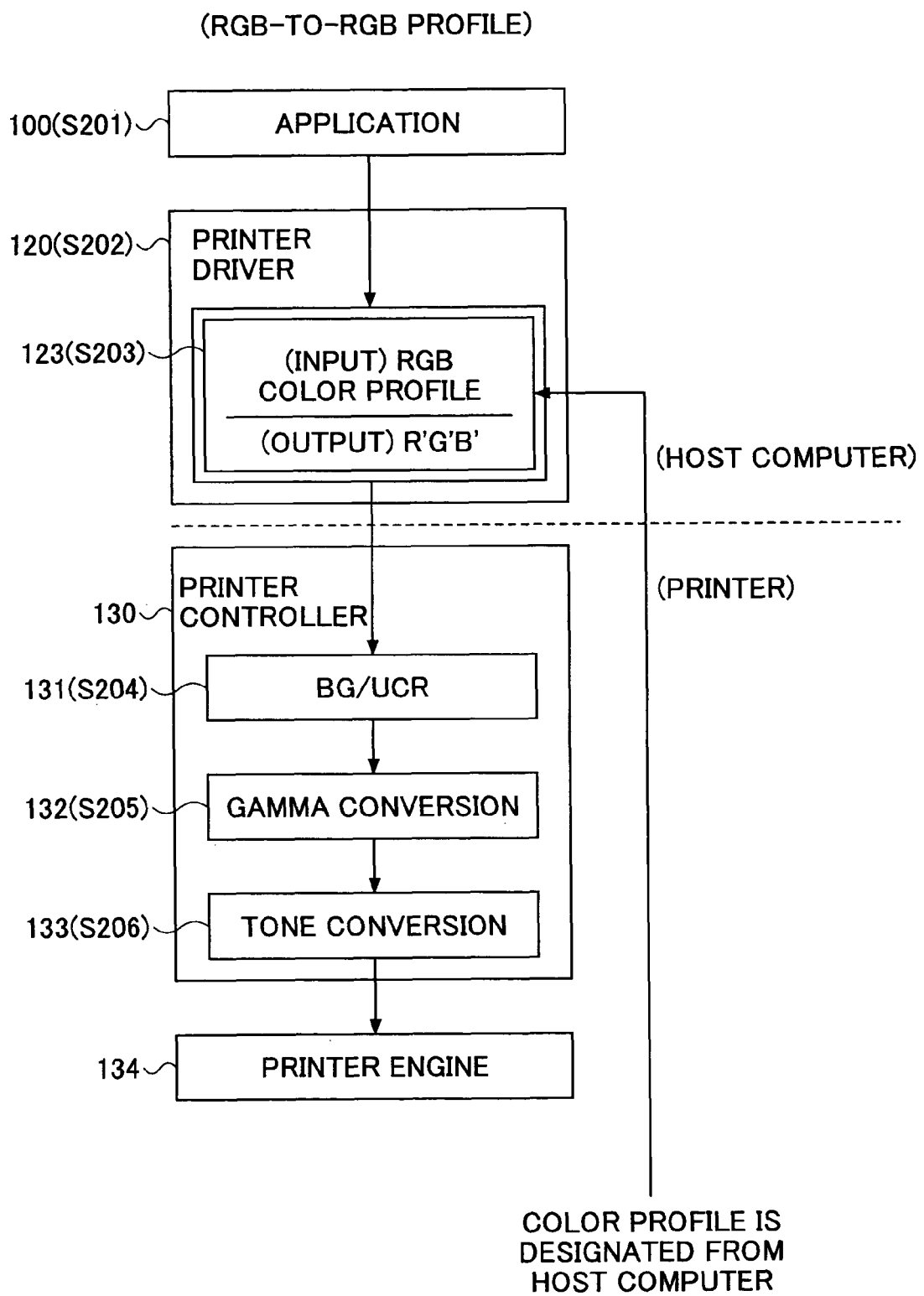
FIG. 5 shows a specific processing procedure according to the embodiment of the present invention in a case where a color profile for RGB-to-RGB color space conversion is provided in a host computer, the color conversion is performed in a printer driver in the host computer, and the conversion result is sent to a printer.

FIG. 5 shows a specific processing procedure in case where, as shown in FIG. 1, the color profiles 123 are provided in the host computer PC, color conversion is performed by the printer driver 120 in the host computer PC, and a result thereof is then transmitted to the printer PR. In the processing shown in FIG. 5, data is transferred from the application 100 to the printer driver 120 in Step S201. In the printer driver 120, the data is converted into a printer language for the printer PR in Step S202, and also, color matching is performed with the use of the color profile 123 in Step S203. The printer profile selected in the above-mentioned matching unit 122 (not shown in FIG. 5) in the printer engine 120, i.e., the color profile 123 converts color in the monitor's RGB color space into the printer's RGB space, and includes the function of correction in printing output color between the printers A and B (for the above-described color adjustment processing for achieving output of color of the printer A from the printer B) added thereto as mentioned above.

Then, the RGB data having undergone the color conversion as mentioned above including the above-described color adjustment processing for achieving output of color of the printer A from the printer B in the printer driver 120 is then transferred to the printer PR. At this time, in the K generation unit (BG/UCR unit) 131 in the printer controller 130, the RGB data having undergone the color conversion with the color profile 123 is then converted into CMYK data in Step S204. Then, γ conversion and tone conversion are performed in the γ conversion unit 132 and the tone conversion unit 133, respectively, as mentioned above, in Steps S205 and S206. After that, the CMYK data is transmitted to the printer engine 134 which actually performs printing out of an color image according to the given CMYK data.

In the example shown in FIG. 5, a user or a service staff may designate the color profile 123 from among the plurality of color profiles 123 suitable to the printer engine 134 actually applied, i.e., according to the type or the printing way of the printer, which is actually applied for printing out a desired color image therewith, such that the thus-selected color profile 123 enables minimization of color difference between the respective printers. It is possible that the host computer PC has a function such that the optimum color profile 123 is automatically selected upon designation input made by the user or the service staff for a particular type of the printer PR or the printer engine 134 actually applied. If such a function is provided in the host computer PC, the user or the service staff merely needs to designate a particular type of the printer PR or the printer engine 134 actually applied instead of actual designation of the color profile 123 directly. In such a case, the designation by the user or the service staff is performed in a manner such that selection is made from among a list of various types of printers previously prepared.

Alternatively, it is also possible that actually color patches are printed out by the currently applied printer as described above with reference to FIG. 3, the thus-printed-out color patches are actually measured by a color measurement equipment, and, based thereon, the host computer PC executes the processing such as that of the above-mentioned steps S101 through S107 with the use of predetermined application software so as to produce a color profile by which the currently applied printer or the printer engine outputs color equivalent to that of another printer or printer engine which was applied originally.

Figure 6:
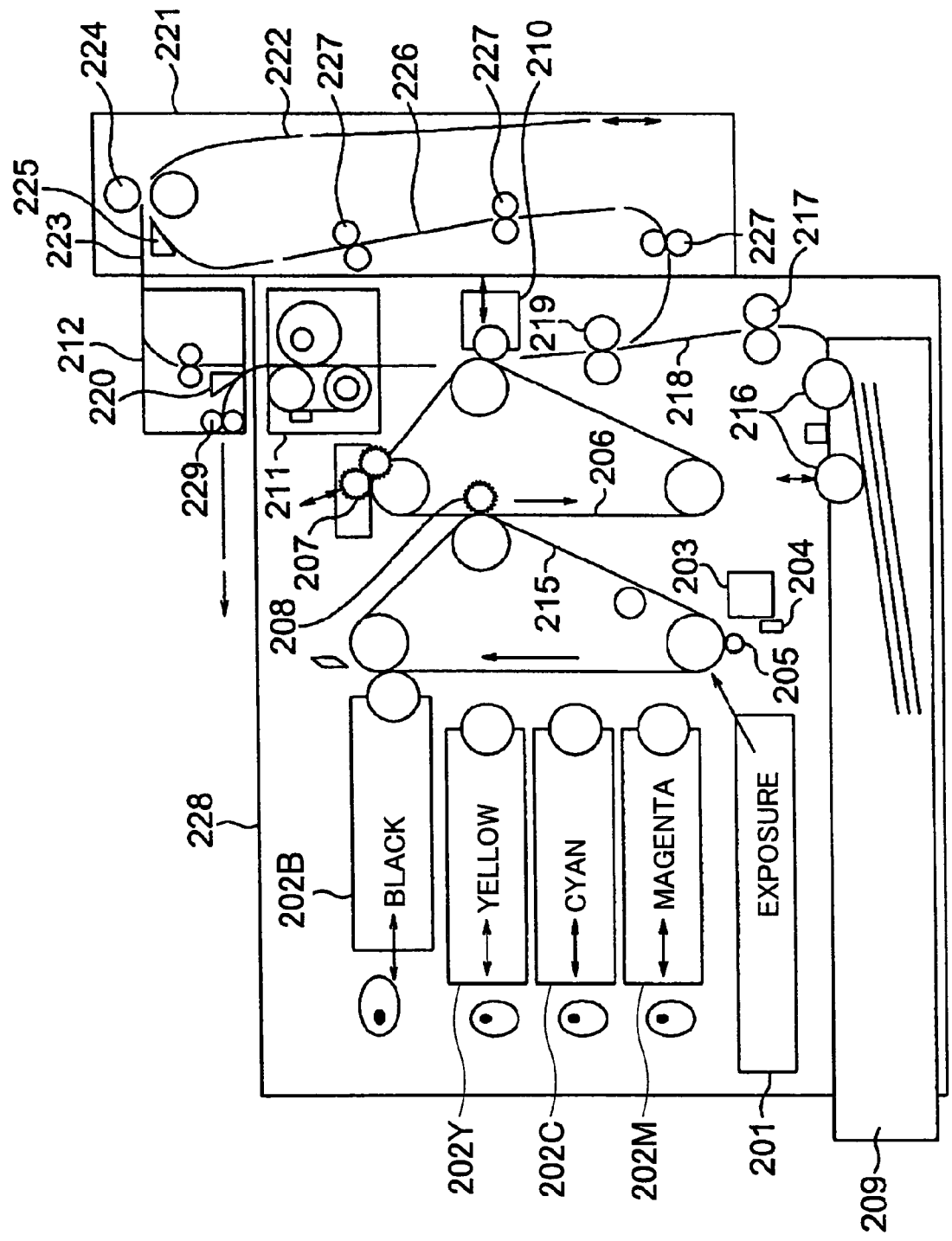
FIG. 6 shows a general configuration of an electrophotographic color printer having image forming units for four colors (cyan, magenta, yellow and black), applicable to the embodiment of the present invention.

The printer engine 134 can be embodied by an image forming apparatus of a printer which performs image formation with four colors (cyan, magenta, yellow and black) as shown in FIG. 6. FIG. 6 illustrates one example of a printer in an electrophotographic type having an image forming unit of the four colors. As shown, the printer includes an image forming unit, a writing unit, a transfer unit, a fixing unit, a paper feeding unit, a double-side paper feeding unit and a paper ejecting unit. The writing unit includes a photosensitive belt 215, a charging unit 205 which electrically charges the photosensitive belt 215, a developing unit 202 including a magenta developer 202M, a cyan developer 202C, a yellow developer 202Y and a black developer 202K forming latent images of the respective colors, a cleaning unit 203 which removes residual toner from the photosensitive belt 215, and a electricity removal unit 204 which removes the electricity from the photosensitive belt 215 so as to make the photosensitive belt 215 usable in a subsequent developing cycle.

The writing unit 201 includes an image processing circuit, an optical system including two laser diodes and a polygon mirror, and a synchronization detection unit performs optical writing or exposure onto the photosensitive belt 215 electrically charged by the charging unit 205, and thus, forms latent images of the respective colors thereon.

The transfer unit includes an intermediate transfer belt 206, a first transfer brush 208 which transfers a toner image from the photosensitive belt 215 to the intermediate transfer belt 206, a second transfer roller 210 which transfers the toner image once transferred to the intermediate transfer belt 206 then to a paper sheet (transfer material) and a cleaning brush 207 which removes residual toner. The fixing unit includes a fixing belt 211 provided on the paper conveyance downstream side with respect to the second transfer roller 210, and fixes the full color toner image already transferred on the paper sheet by pressure and heat.

The paper feeding unit includes a paper feeding tray 209 which contains paper sheets to be used for forming images thereon, paper feeding rollers 216 which draw the paper from the paper feeding tray 209 and feeds it toward a conveyance path 218, conveyance rollers 217 conveying the paper along the conveyance path 218 and registration rollers 219 which feeds out the paper in a timing in which the front edge of the image on the intermediate transfer belt 206 comes at a second transfer part in which the second transfer roller 210 is provided. The double-side paper feeding unit 221 includes a branch unit 212 and a switch back path 222. The branch unit 212 has a branch nail, and performs switching of a conveyance direction for the paper on which the image was fixed between a conveyance path for conveying the paper toward the paper ejecting unit and a conveyance path for conveying the paper toward a double-side unit 221. The double-side unit 221 includes a paper conveying path 223 for conveying the paper from the branch unit 212 to the switch back path 222, a switch back roller 224 performing switch back operation of the paper conveyed from the switch back path 222, and a conveyance path 226 for providing the paper again toward the second transfer roller 210 via the branch nail 225 from the switch back roller 224. The paper conveyance path 226 conveys the paper which was inverted by the double-side unit to a nip part of the registration rollers 219. In the paper conveyance path 226, a plurality of paper conveyance roller pairs 227 are provided for conveying the paper appropriately along the paper conveyance path 226. The paper ejecting unit includes a paper ejection tray 228 and paper ejection rollers 229 which ejects the paper to the ejecting tray 228 from the branch unit 212.

The printer configured as described above operates as follows: Latent images are formed on the photosensitive belt 215 by a laser beam emitted by the writing unit 210, and the magenta, cyan, yellow and black developers 202M, 202C, 202Y and 202B develop the latent images with the toners of the respective colors on the belt. The charging unit 205, the electricity removing unit 204 and the cleaning belt 203 perform electricity charging, removing the charges, and cleaning the photosensitive belt 215, respectively. After that, the intermediate transfer belt 206, the cleaning brush roller 207 and the first transfer brush 208 perform intermediate transfer of the toner images to the intermediate transfer belt 206. Then, the toner images on the intermediate transfer belt 206 are transferred to the paper drawn out from the paper feeding tray 209 by the second transfer roller 210, and thus, finally the full color image is formed on the paper. The image thus formed on the paper is fixed thermally by the fixing unit 211, the paper passes through the branch unit 212, and then, is ejected either to the ejecting tray 228, or to the double-side unit 221, in the apparatus configuration shown in FIG. 6. By a series of these operations, printing out is performed based on printing data provided from the host computer PC via the printer controller 130.

Although the electrophotographic type of printer has been descried, another printer including any other well-known type of printer engine may be applied instead, such as an ink jet type one or such.

Thus, in the example shown in FIG. 5, the user or the service staff designates appropriate one of the 'RGB to RGB' color profiles 123 for the printer engine 134 of the actually applied printer PR, on the host computer PC according to the type or the printing way of the relevant printer engine 134. Then, based on the thus designated color profile 123, monitor color information in the sRGB monitor 21 of the host computer PC is converted into printing color information suitable for the printer PR actually applied. The color conversion thus performed includes color correction between the respective printers mentioned above, and thereby, it becomes possible to print out desired color regardless of the particular type or printing way of the printer actually applied.

Figure 7:
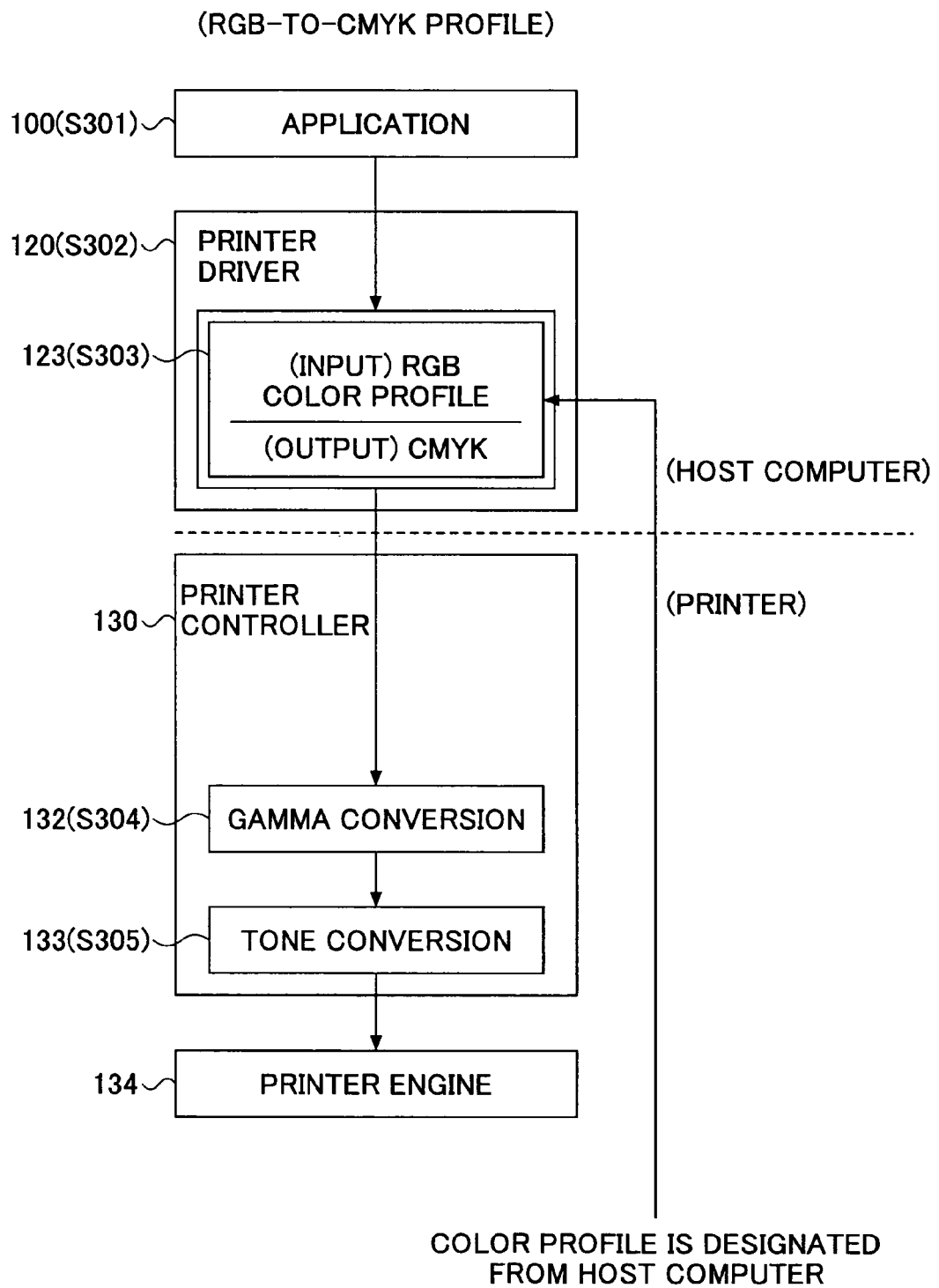
FIG. 7 shows a specific processing procedure according to the embodiment of the present invention in a case where a color profile for RGB-to-CMYK color space conversion is provided in a host computer, the color conversion is performed in a printer driver in the host computer, and the conversion result is sent to a printer.

Although FIG. 5 illustrates an example in which 'RGB to RGB' color profiles 123 are provided in the printer driver 120 in the host computer PC, it is also possible that color profiles provided are those of 'RGB to CMYK'. In this case, since the printer driver 120 performs color conversion from RGB to CMYK, the printer controller 130 should not perform 'RGB to CMYK' color conversion. FIG. 7 shows this example.

As shown in FIG. 7, 'RGB to CMYK' color profiles 123 are provided in the printer driver 120 as mentioned above, and data is transferred from the application 100 to the printer driver 120 in Step S301. In the printer driver 120, the data is converted into a printer language for the printer PR in Step S302, and also, color matching is performed with the use of the color profile 123 in Step S303. The printer profile selected in the above-mentioned matching unit 122 in the printer driver 120 is the color profile for performing color conversion from RGB color space to CMYK color space, and, the same as the above, the color profile includes the function of adjustment of printed color between the respective printers, added thereto.

Then, the CMYK data having undergone the color conversion as mentioned above including the above-described color adjustment processing for achieving output of color of the printer A from the printer B in the printer driver 120 is then transferred to the printer PR. In this case, since it is not necessary to perform color conversion to CMYK data with the use of the K generation unit (BG/UCR unit) 131, the given data is transferred to the γ conversion unit 132 as it is, which then performs γ conversion on the given data in Step S304. Then, after that, the tone conversion unit 133 performs tone conversion on the given data in Step S305. After that, the CMYK data is transmitted to the printer engine 134 which then performs actual printing out of an color image according to the given CMYK data.

Figure 8:
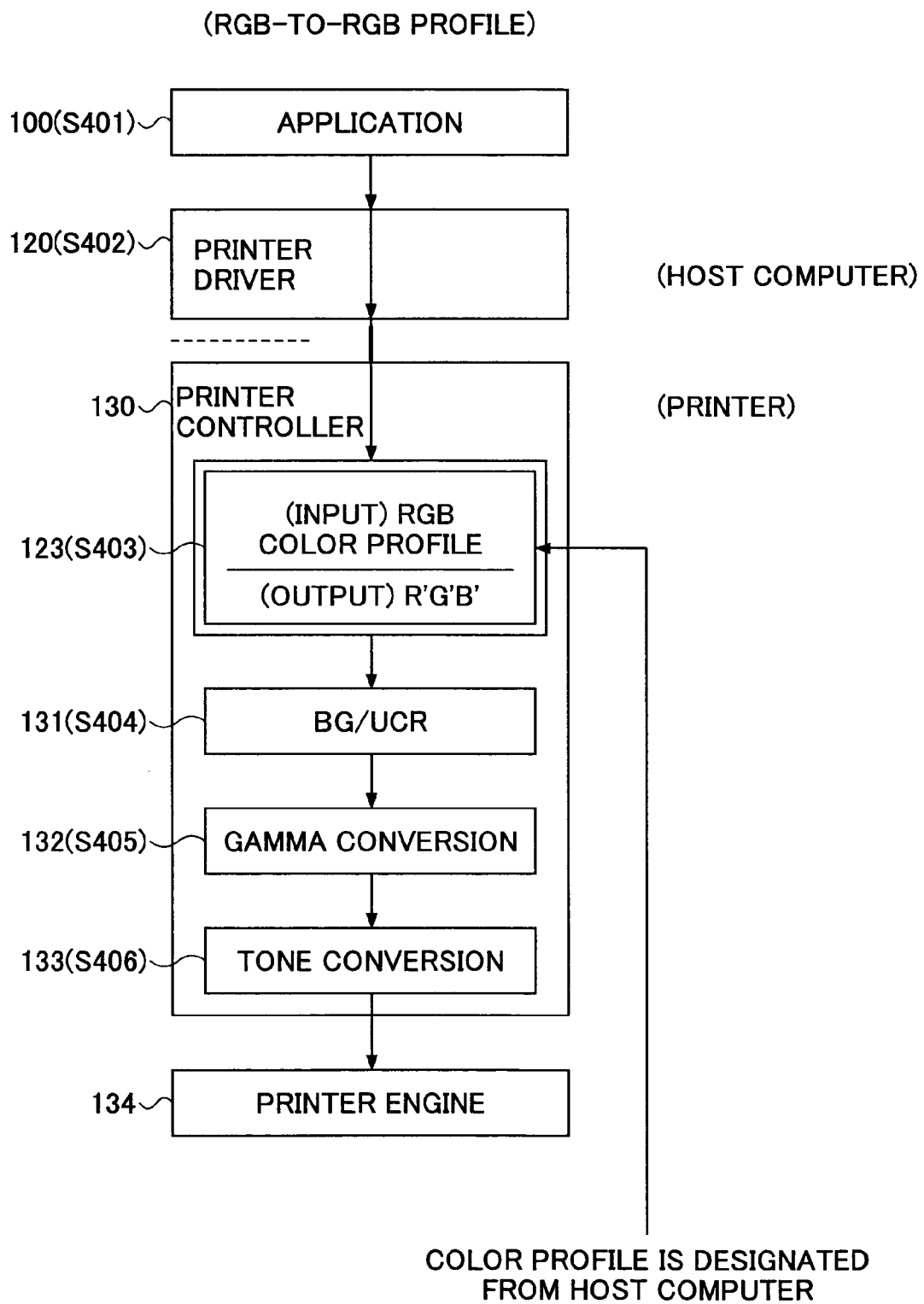
FIG. 8 shows a specific processing procedure according to the embodiment of the present invention in a case where a color profile for RGB-to-RGB color space conversion is provided in a printer, the color conversion is performed in a printer controller in the printer, and the conversion result is sent to a printer engine.

FIG. 8 shows another example in which the color profiles 123 for color conversion from RGB to RGB are provided in the printer PR. In this case, data is transferred from the application 100 to the printer driver 120 in Step S401. In the printer driver 120, the data is converted into a printer language for the printer PR in Step S402. After that, the thus-obtained RGB color data representing color in the monitor space is transferred to the printer controller 130 in the printer PR from the host computer PC. In the printer controller 130, color matching is performed with the use of color profile 123 in Step S403. In the color matching in Step S403, one of the plurality of color profiles 123 for RGB to RGB is selected according to instructions given via the host computer PC according to, the printer engine 134 actually applied, whereby the given RGB data is converted into RGB data corresponding to the printer engine 134 of the printer PR. The color profile selected there includes the function of correction in printing output color between the respective printers (for the above-described color adjustment processing for achieving output of color of the original printer A from the newly applied printer B, for example) added thereto as mentioned above. Thereby, it is possible to achieve printing out of color which is approximately same as that obtained from another original printer.

Then, the RGB data having undergone the color conversion as mentioned above including the above-described color adjustment processing for achieving output of color of the original printer from the current printer is then transferred to the K generation unit (BG/UCR unit) 131. The RGB data having undergone the color conversion with the color profile 123 as mentioned above is then converted into CMYK data in Step S404 in the K generation unit 131. Then, γ conversion and tone conversion are performed in the γ conversion unit 132 and the tone conversion unit 133, respectively, as mentioned above, in Steps S405 and S406. After that, the CMYK data is transmitted to the printer engine 134 which performs actual printing out of color image according to the given CMYK data.

Although FIG. 8 illustrates an example in which 'RGB to RGB' color profiles 123 are provided in the printer controller 130 in the printer PR, it is also possible that color profiles provided there are those of 'RGB to CMYK'. In this case, as shown in FIG. 9, since the color correction performed according to the color profile 123 includes color conversion from RGB to CMYK, the K generation unit 131 becomes unnecessary.

Figure 9:
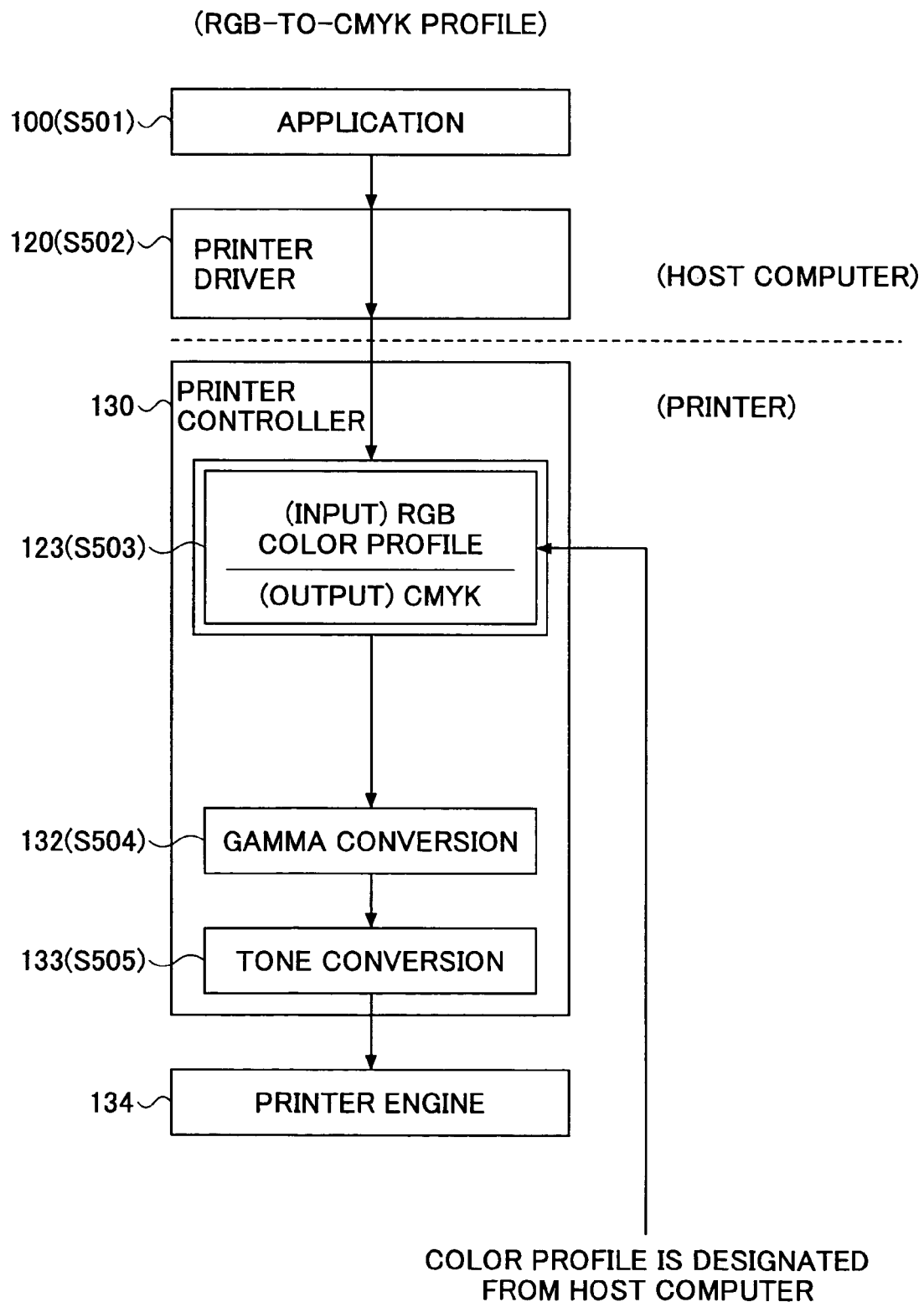
FIG. 9 shows a specific processing procedure according to the embodiment of the present invention in a case where a color profile for RGB-to-CMYK color space conversion is provided in a printer, the color conversion is performed in a printer controller in the printer, and the conversion result is sent to a printer engine.

In the case of FIG. 9, data is transferred from the application 100 to the printer driver 120 in Step S501. In the printer driver 120, the data is converted into a printer language for the printer PR in Step S502, and after that, the data thus obtained which is RGB color data representing color of the monitor space is transferred to the printer controller 130 in the printer PR from the host computer PC. There, color matching is performed with the use of the color profile 123 in Step S503. The printer profile selected in the above-mentioned matching unit 122 (not shown in the figure) provided in the printer controller 130 in this case is the color profile for performing color conversion from RGB color space to CMYK color space, and, the same as the above, the color profile includes the function of correction of printed color between the respective printers, added thereto. Then, the CMYK data having undergone the color conversion as mentioned above including the above-described color adjustment processing for achieving output of color of the original printer from the current printer in the color matching unit 122 is then transferred to the γ conversion unit 132, which then performs γ conversion on the given data in Step S504. Then, after that, the tone conversion unit 133 performs tone conversion on the given data in Step S505. After that, the CMYK data is transmitted to the printer engine 134 which then performs printing out of color image according to the given CMYK data.

As the printer profiles 123 prepared for RGB color data of the above-mentioned sRGB monitor, a plurality of color profiles 123 which include the above-mentioned inter-printer output color correction functions are previously provided according to respective machine types and printing ways of printers or printer engines. When actually printing out a color image from the printer B, a user selects an appropriate one from among the plurality of color profiles, the thus-selected color profile being then applied. Thus, the user needs only to select the color profile 123 from the host computer PC, and thus, it becomes possible that color of the printer A is reproduced from the printer B with a simple operation.

The procedures described above with reference to FIGS. 5, 7, 8 and 9 are embodied in a form of programs executable by a computer, which programs are installed into the host computer or into the printer controller from a predetermined recording medium such as a CD-ROM, or downloaded from a predetermined server via a communication network such as the Internet, a LAN or such. Then, the thus-installed program is executed by the host computer or the printer controller. By these procedures thus executed, in the relevant printer system, even when the type of the printer or such is changed, it becomes possible to reproduce color equivalent to color obtained before as mentioned above.

Even specific details are omitted for a method or a device for establishing the printer simulator, a method or a device for creating the color profile enabling minimization of color difference, or such, these can be achieved with the use of well-known arts.

Thus, according to the embodiment of the present invention, from among a plurality of color profiles prepared for a plurality of different printers for performing color conversion of color information within a same color space or through different color spaces, a color profile 123 such that printing output color becomes approximately equal between the printer A and printer B, is selected. Then, based on the thus-selected color profile 123, input color information is converted or adjusted, and the thus-obtained color information is provided to the printing device or the printer engine. As a result, it becomes possible to obtain color approximately equal to color of the printer A even from the printer B.

At this time, a color profile 123 is selected from among a plurality of color profiles performing color conversion between RGB color spaces, whereby printing output color becomes approximately equal between the printer A 31 and the printer B 33, or, a color profile 123 is selected from among a plurality of color profiles performing color conversion from an RGB color space into a CMYK color space, whereby printing output color becomes approximately equal between the printer A 31 and the printer B 33. As a result, color conversion corresponding to a particular color space can be obtained, and thus, it becomes possible to achieve color printing output having color equal among a plurality of printers regardless of a particular type of color space to be actually applied.

Thereby, it becomes possible to achieve color matching up between the printer A 31 and the printer B 33 only by selecting an appropriate color profile 123 from the host computer PC without the need to change the configuration of the printer PR, or by selecting an appropriate color profile 123 from the printer PC without regard to the configuration of the host computer PC.

Further, when performing color conversion for obtaining color from the printer B approximately equal to color originally obtained from the printer A, since a plurality of color profiles are prepared for obtaining color printing output having color approximately equal between the printers A and B, it becomes possible to achieve color printing output having color which is made approximately equal to that of the other printer easily at high accuracy. At this time, since these color profiles are those enabling minimization of color difference in a color space which does not depend from devices, it becomes possible to achieve color printing output well adjusted between the respective printers in a range of a minimized color difference at high accuracy by setting the profile. Selection of the color profile 123 may be made from the host computer PC directly or indirectly via designation of a particular printer type or such by a user, thus operation needed becoming easier, and also, it is possible to adjust color while confirming by human eyes. Accordingly, it becomes possible to achieve color output according to human sense. In other words, it is possible to select an appropriate color profile by which color for which the operator feels it is most equivalent to the original one.

Thus, according to the embodiment of the present invention, (i) since color matching is performed in a color space of device non-dependent color, it becomes possible to reproduce color of the printer A from the printer B more positively; (ii) since matching is performed throughout all the color space including color mixture, it becomes possible to reproduce color of the printer A from the printer B more accurately; (iii) even when difference in color material of ink (toner) exists which cannot be well eliminated only by correction with respect to respective single colors of CMYK, it becomes possible to achieve color output which is closer to the original color according to the embodiment of the present invention employing a method of directly minimizing color difference more preferably in the device non-dependent color space; and (iv) thereby, it becomes possible to obtain color output from another printer equivalent to color output from one printer even these printers have different machine types, or employ different printing ways or different color material.

Further, the present invention is not limited to the above-described embodiments, and variations and modifications may be made without departing from the basic concept of the present invention claimed.

The present application is based on Japanese priority applications Nos. 2003-076154 and 2004-50207, filed on Mar. 19, 2003 and Feb. 25, 2004, respectively, the entire contents of which are hereby incorporated by reference.

What is claimed is:

1. An image processing apparatus provided in a host image forming apparatus amongst a plurality of image forming apparatuses, said image processing apparatus comprising:
   a color conversion part performing color conversion as between the host image forming apparatus and another one of the plurality of image forming apparatuses, including a first printer;
   a plurality of color profiles whereby colors of images formed by the host image forming apparatus may be made effectively approximate to those formed by other ones of the plurality of image forming apparatuses, through color conversion performed by said color conversion part with the use of the color profiles,
   said color conversion part using a color profile from amongst the color profiles provided in the host image forming apparatus to convert input color data, in a RGB color space, to converted color data, in a device-dependent RGB color space of said host image forming apparatus, for reproducing colors obtained by said first printer by applying said input color data, each of said input color data and said converted color data corresponding to a same color in a predetermined device-independent color space which does not depend on apparatus types; and
   a tone conversion part converting the converted RGB color data to converted CMYK data and forwarding the converted CMYK data to a printer engine of the host image forming apparatus, the printer engine reproducing the colors corresponding to the converted RGB color data by mixing or blending CMYK color materials,
   wherein the plurality of image forming apparatuses have respective different dither matrixes,
   wherein the color profile is generated by a process including:
   (a) producing, in a computer, color patch data by uniformly dividing a RGB color space;
   (b) obtaining color patches corresponding to the color patch data in an image formed by a first image forming apparatus of an apparatus type of said first printer;
   (c) measuring color of the color patches in the predetermined device-independent color space;
   (d) obtaining a relationship, for each color patch, between a first color space which depends on the apparatus type of the first printer and the predetermined device-independent color space, based on a measurement result of (c);
   (e) obtaining a relationship between the predetermined device-independent color space in an image formed by a second image forming apparatus of an apparatus type of said host image forming apparatus and a second color space which depends on said apparatus type of said host image forming apparatus; and (f) calculating a coordinate value in the second color space which depends on the apparatus type of said host image forming apparatus for each color patch whereby color of an image formed by said host image forming apparatus has a color difference which is effectively reduced from color of an image formed by said first printer, according to the relationship between the predetermined device-independent color space in an image formed by said host image forming apparatus and the second color space which depends on the apparatus type of said host image forming apparatus, obtained in (e), wherein color in an image formed by said host image forming apparatus using said device-dependent input color data is visually equal to color of an image formed by said first printer using said converted device-dependent color data.

2. The image processing apparatus as claimed in claim 1, wherein:

said plurality of color profiles are provided from actually measuring color of an image formed by one of said plurality of image forming apparatuses, and creating a color profile whereby color of an image effectively approximating the measured color is formed by another of said plurality of image forming apparatuses approximately equal thereto.

3. The image processing apparatus as claimed in claim 1, wherein:

said plurality of color profiles comprise color profiles whereby a color difference in a color space which does not depend on apparatus types between images formed by the image forming apparatuses may be made to effectively approximate each other.

4. The image processing apparatus as claimed in claim 3, wherein:

said color space which does not depend on apparatus types comprises any one of an LAB color space, an XYZ color space and an LUV color space defined by CIE.

5. The image processing apparatus as claimed in claim 1 comprising a controller provided in the host image forming apparatus which forms an image having color which is made to effectively approximate color of image formed by another of said plurality of image forming apparatuses with the use of the color profile.

6. The image processing apparatus as claimed in claim 1, further comprising a part selecting a color profile to be applied from among the plurality of color profiles.

7. The image processing apparatus as claimed in claim 6, wherein:

a host computer which provides printing information to the image forming apparatus comprises said part selecting a color profile to be applied from among the plurality of color profiles.

8. An image forming apparatus comprising:

the image processing apparatus claimed in claim 1; and an image forming part which forms a visible image on a recording medium based on image information output from said image processing apparatus.

9. The image processing apparatus of claim 1, wherein the image formed by the second image forming apparatus corresponds to the color patches produced in (a).

10. The image processing apparatus of claim 1, wherein a type of color material of the first printer is one of ink and toner and a type of color material of the host image forming apparatus is the other of ink and toner.

11. An image processing apparatus provided in a host image forming apparatus amongst a plurality of image forming apparatuses, said image processing apparatus comprising:

a color conversion part performing color conversion as between the host image forming apparatus and other ones of the plurality of image forming apparatuses;

a color profile, said color conversion part using the color profile provided in the host image forming apparatus to convert input color data, in a RGB color space to converted color data in a device-dependent RGB color space of said host image forming apparatus, for reproducing by the host image forming apparatus colors obtained by another image forming apparatus applying said input color data, each of said input color data and said converted color data corresponding to a same color in a predetermined device-independent color space which does not depend on apparatus types;

a tone conversion part converting the converted RGB color data to converted CMYK data and forwarding the converted CMYK data to a printer engine of the host image forming apparatus, the printer engine reproducing the colors corresponding to the converted RGB color data by mixing or blending CMYK color materials, wherein the plurality of image forming apparatuses have respective different dither matrixes, and wherein the color profile is produced according to the steps of:

producing color patch data by uniformly dividing a RGB color space;

sending the color patch data to each of a first printer and a second printer for printing color patch images corresponding to the color patch data by each printer;

measuring a color of the color patch images printed by the first printer in a device independent color space to obtain a first relationship between the color patch data and the color of the corresponding color patch images printed by the first printer;

measuring a color of the color patch images printed by the second printer in the device independent color space to obtain a second relationship between the color patch data and the color of the corresponding color patch images printed by the second printer; and calculating the color profile using the first relationship and the second relationship.

12. A method for a host image forming apparatus, amongst a plurality of image forming apparatuses, to perform color conversion as between the host image forming apparatus and other ones of the plurality of image forming apparatuses, the method comprising the steps of:

providing in the host image forming apparatus a color profile generated by performing steps comprising:

producing color patch data by uniformly dividing a RGB color space;

sending the color patch data to each of a first printer and a second printer for printing color patch images corresponding to the color patch data by each printer;

measuring a color of the color patch images printed by the first printer in a device independent color space to obtain a first relationship between the color patch data and the color of the corresponding color patch images printed by the first printer;

measuring a color of the color patch images printed by the second printer in the device independent color space to obtain a second relationship between the color patch data and the color of the corresponding color patch images printed by the second printer; and calculating a color profile using the first relationship and the second relationship;

using the color profile provided in the host image forming apparatus to convert input color data, in a RGB color space, to converted color data, in a device-dependent RGB color space of said host image forming apparatus, for reproducing by the host image forming apparatus colors obtained by another image forming apparatus applying said input color data, each of said input color data and said converted color data corresponding to a same color in a predetermined device-independent color space which does not depend on apparatus types; and converting, by the host image forming apparatus, the converted RGB color data to converted CMYK data and forwarding the converted CMYK data to a printer engine of the host image forming apparatus, the printer engine reproducing the colors corresponding to the converted RGB color data by mixing or blending CMYK color materials, wherein the plurality of image forming apparatuses have respective different dither matrixes.

13. The method of claim 12, wherein the color profile is calculated using the first relationship and the second relationship according to the steps of:

obtaining a reverse of the second relationship for determining input color data for sending to the second printer based on desired output color of images printed by the second printer measured in the device independent color space;

determining, using the reverse of the second relationship, corrected color patch data for sending to the second printer corresponding to the color of the color patch images printed by the first printer measured in the device independent color space; and comparing the color patch data sent to the first printer to the corrected color patch data.

14. A computer readable medium tangibly embodying a program of instructions executable by a processor in a host image forming apparatus to perform a method for color conversion as between the host image forming apparatus and other ones of the plurality of image forming apparatuses, by using a color profile obtained by:

producing color patch data by uniformly dividing a RGB color space;

sending the color patch data to each of the first printer and second printer for printing color patch images corresponding to the color patch data by each printer;

measuring a color of the color patch images printed by the first printer in a device independent color space to obtain a first relationship between the color patch data and the color of the corresponding color patch images printed by the first printer;

measuring a color of the color patch images printed by the second printer in the device independent color space to obtain a second relationship between the color patch data and the color of the corresponding color patch images printed by the second printer; and calculating the color profile using the first relationship and the second relationship, said method for color conversion comprising:

using the color profile provided in the host image forming apparatus to convert input color data, in a RGB color space, to converted color data, in a device-dependent RGB color space of said host image forming apparatus, for reproducing by the host image forming apparatus colors obtained by another image forming apparatus applying said input color data, each of said input color data and said converted color data corresponding to a same color in a predetermined device-independent color space which does not depend on apparatus types; and converting, by the host image forming apparatus, the converted RGB color data to converted CMYK data and forwarding the converted CMYK data to a printer engine of the host image forming apparatus, the printer engine reproducing the colors corresponding to the converted RGB color data by mixing or blending CMYK color materials, wherein the plurality of image forming apparatuses have respective different dither matrixes.

15. The image processing apparatus as claimed in claim 1, wherein the color profile used to perform the color conversion is selected from said plurality of color profiles in response to selection of said another one of the plurality of image forming apparatuses.

16. The image processing apparatus as claimed in claim 1, wherein the color profile used to perform the color conversion is selected from said plurality of color profiles in response to designation of a type of said first printer in said another one of the plurality of image forming apparatuses.

* * * * *